INVENTOR
ROGER BAJULAZ
By Young & Thompson
ATTYS

United States Patent Office 3,411,472
Patented Nov. 19, 1968

3,411,472
SUBMARINE CRAFT
Roger Bajulaz, Genthod-Geneva, Switzerland, assignor to Roger Bajulaz S.A., Genthod-Geneva, Switzerland, a Corporation of Switzerland
Filed June 12, 1967, Ser. No. 645,180
Claims priority, application Switzerland, June 28, 1966, 9,358/66
15 Claims. (Cl. 114—16)

ABSTRACT OF THE DISCLOSURE

The invention concerns a safe submarine craft comprising a submersible cabin and an immersion device, said immersion device comprising a duct fastened on said cabin and having one end dipping into the water even in the surface position of the craft. A motor is used for pumping water into said duct above the water level to submerge the cabin.

---

Numerous types of submarine boats exists, they however may be divided into two categories: the pocket-type submarine that can reach relatively great depth, and the beach or attraction submarine that comprises a safety device limiting their submersion depth to 1–3 meters only.

The present submarine comes within the second category. The presently existing craft of this type include a cabin mechanically connected to a safety device or float. To move from the surface position to the submerged position a relative displacement is necessary between the cabin and the safety device. The consequence is that the mechanical liaison between these two main elements is difficult to achieve, is delicate and requires a frequent maintenance. As a matter of fact, this mechanical liaison presents hinges, cables or control components that are intermittently working under water, which is particularly damaging.

The present invention tends to remedy these drawbacks and has for its object a submersible craft comprising a passenger cabin at least partly submersible and control components of an immersion device causing the immersion of the passenger cabin into—and its emersion out of—the water level on which the craft moves about, characterized by the fact that the buoyancy of the craft when in submerged position is greater than the weight of the craft, by the fact that the immersion device is constituted by a duct, at least one part of which, when on service position, transmits a force to the craft, this force being oriented in the oppoiste direction to the buoyancy of this craft, and by the fact that the lower extremity of this duct comes out underneath the water line of the craft when the latter happens to be in surface position, while the upper extremity of this duct comes out above this water line and is connected to an air sucking device, and by the fact that this duct presents a volume that stays above said water line and inside which the air sucking device is likely to create a depression causing the raising, above the water level on which the craft moves about, of a quantity of water sucked up by the lower extremity of the duct, this volume corresponding to a mass of water, whose weight is at least equal to the buoyancy of the craft when in surface position but lower than its buoyancy when in fully submerged position.

The attached drawing, schematically and as an example, shows one embodiment of the submersible craft.

The craft illustrated in FIGS. 1–10 comprises different components as follows:

(1) One passenger cabin.
(2) One immersion device, on one part of which the passenger cabin is rigidly fastened in service position.
(3) One propulsion device.
(4) One ventilation device for the passenger cabin.

Figure 1:
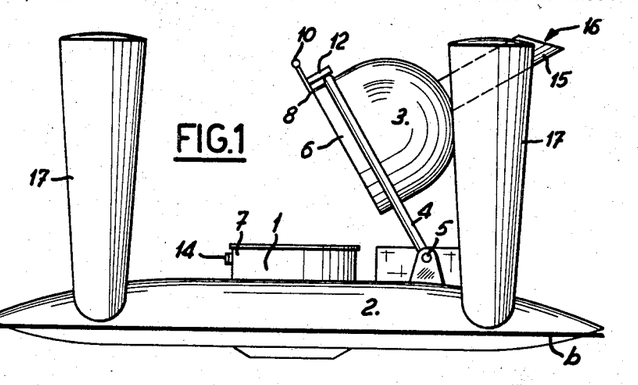
FIGURE 1 illustrates the craft when in surface position.
Figure 2:
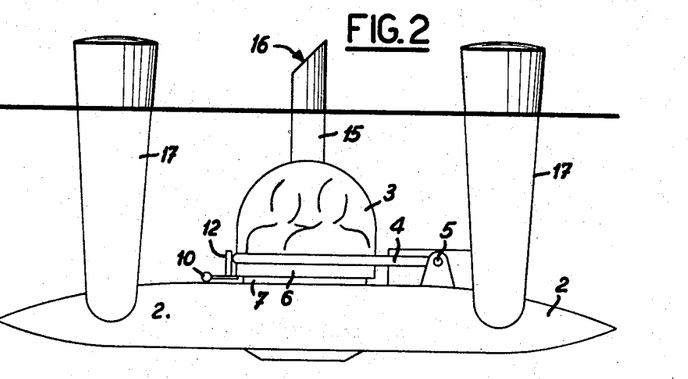
FIGURE 2 illustrates the craft when in submerged position.

(A) The passenger cabin of the craft consists of a cabin 1, rigidly fastened, in service position, onto two lateral floats 2 which are a part of the immersion device which shall be described further. This cabin 1 may be fastened onto these floats or stabilization chambers 2, either permanently or in a removable way, which offers certain advantages, particulraly for the transportation and storage of the craft.

Figure 3:
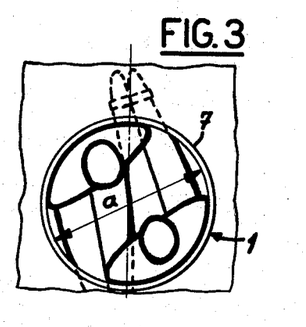
FIGURE 3 is a partial view seen from above, illustrating the arrangement of the passengers inside the cabin.

This cabin 1, in its upper part, offers a general cylindrical form of a diameter $a$ sufficient to accommodate the bodies of two persons (FIG. 3). The bottom of this cabin 1 is constituted by a bench placed in its middle and disposed about diametrically in relation to the upper part of this cabin, on which two passengers may sit, face to face. This bottom also comprises two recesses, disposed on either side of the middle bench, to accommodate the passengers' legs.

It is to be noted that this arrangement of the passengers is extremely judicious for several reasons, the main of which being that:

(a) The passengers are seated facing each other, which is more pleasant.

(b) In this manner, the position of the passengers permits reducing as much as possible the volume of the cabin without hindering them. This is important due to the fact that the greater the volume of the cabin the greater the ballast that is necessary for the immersion of the craft. Therefore, by reducing the volume of this cabin we also reduce the ballast necessary.

(c) The passengers thus arranged, the cabin, and therefore the craft, is balanced. As a matter of fact, with their head to foot position, the passengers constitute a load that has its centre of gravity approximately at the middle of the bottom of the cabin.

This passenger cabin also comprises a cover 3 destined to obturate the upper opening of the cabin when the craft is in service position. This cover 3 is formed by a hemispherical dome of transparent synthetic material. The diameter of the opening of this cover is slightly larger—approximately 5 to 20 centimetres—than the external diameter of the upper part of the cabin. This cover 3 is fastened on one or several arms 4 hinged at 5 onto the floats 2 of the craft in such a manner that this cover 3 may move from its closed position, in which it is engaged on the upper part of the cabin 1, up to its open position, in which it is tipped up toward the rear of the craft and uncovers the opening of the cabin 1.

When in closed position (FIGS. 2 and 4) the lower edge 6 of this cover 3 is concentric with the edge 7 of the upper part of the cabin 1, but underneath that edge, about 10 to 30 centimeters away. The lower part of the cover 3 therefore surrounds—when it is in closed service position—the upper part of the cabin 1.

In view of the difference in diameter between the upper part of the cabin 1 and the opening of the cover 3, a free annular space is provided between these two elements and the water-tightness of the passenger cabin, when in submerged position, is ensured thanks to the diving-bell effect of the cover, as will be verified further.

Figure 4:
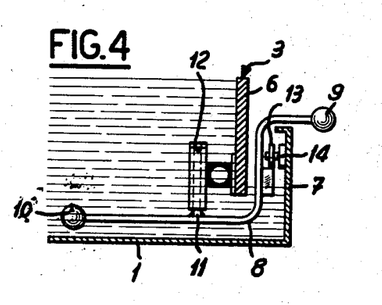
FIGURE 4 is a larger scale detail illustrating the locking device of the craft cockpit.

Finally, this cover 3 also comprises a locking device by which it may be fastened in its closed service position onto the cabin 1 in order to prevent any improper opening of the passenger cabin. This locking or closing device comprises a bent lever 8, each extremity of which is provided with a manipulation component 9, 10. This bent lever 8 extends starting from the outside of the passenger cabin up to the inside of the cabin, passing through the annular space between the cover 3 and the cabin 1. In this manner, one 9 of the manipulation components is located inside the passenger cabin while the other 10 is located outside of the passenger cabin when it is closed.

This bent lever 8 comprises, on the one hand, a pivot 11 that pivots inside a bearing 12 fastened to the lower edge 6 of the cover 3 and, on the other hand, a locking device 13 destined to co-operate, when in closed position, with a finger 14 fastened to the upper part of the cabin 1.

By pivoting the bent lever 8 around the pivot 11, the lever moves from its closed position, in which the locking device 13 co-operates with the finger 14 in order to fix the relative position of the cover 3 and the cabin 1, to an open position in which the finger 14 escapes the locking device 13 so that the cover 3 may be tipped around its pivot 5.

It is to be noted that this locking device may be actuated either from the outside or from the inside of the passenger cabin when it is closed which, in terms of safety, constitutes a great advantage.

Finally, this passenger cabin is provided with a periscope constituted by a tube 15 fastened by one of its extremities onto the upper external part of the cover 3 and the extremity of which is provided with a mirror 16 in a 45° inclined position. The length of the tube 15 is such that the mirror 16 emerges from the water even when the craft is in submerged position.

(B) The immersion device, allowing the passage of the craft from its surface position to its submerged position, comprises the floats 2 on which the cabin 1 is fastened, together with chimneys or reservoirs 17, four in the example shown, fastened to these floats. In the example shown, each float 2 presents a chimney 17 at each of its ends.

Figure 5:
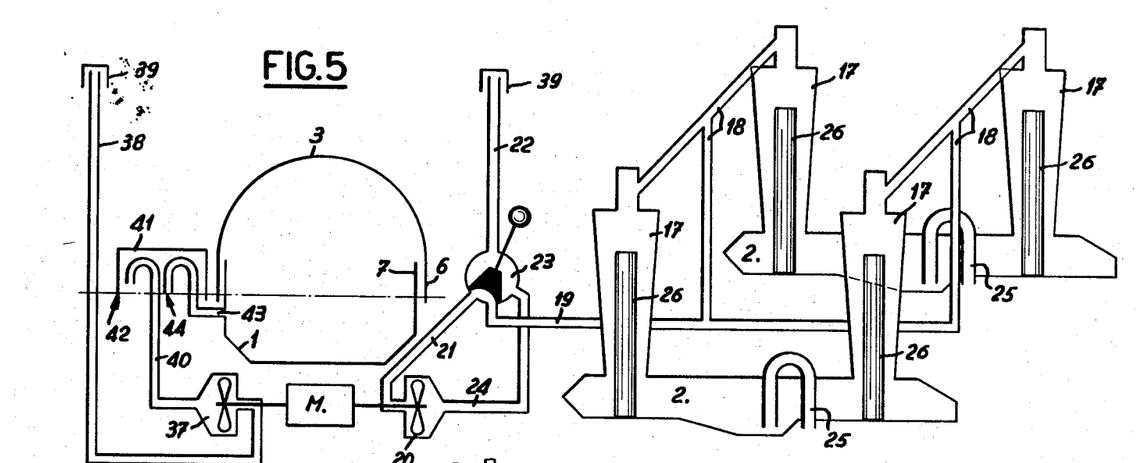
FIGURE 5 is a schematical view illustrating the immersion device.

Each of these chimneys 17 communicates with the inside of the float 2 on which it is fastened, while the upper parts of all these chimneys are closed and connected between themselves by means of ducts 18 themselves connected to a feeding duct 19. It is evident that the schematic arrangement shown at FIG. 5 is not realized in practice. As a matter of fact, the ducts 18 may be constituted by flexible pipe and housed right in the inside of these chimneys and these floats. However, the diagram of the FIGURE 5 allows to more easily show the functioning of the immersion device.

This immersion device further includes a blower 20 constituted by a fan, driven and rotated by means of a motor M, and a four-way valve 23 allowing to connect the suction side 21 of the blower 20 to the feeding duct and then again to a discharging tube 22.

This four-way valve 23 thus allows—when in the position as shown in FIG. 5—to connect the suction side 21 of the blower 20 to the feeding duct 19 and simultaneously the discharge side 24 of this blower 20 to the discharge tube 22, and when it is in a second position (FIG. 6) to connect the suction side 21 of the blower 20 to the discharge tube 22 and simultaneously the discharge side 24 of this blower 20 to the feeding duct 19.

This way, the upper parts of the chimneys 17 are either connected in parallel to the suction side 21 of the blower 20 or connected to the free air by means of a discharge tube 22.

Finally, each float 2 is connected with the water on which it is found, by means of a siphon 25.

It must also be said that the weight of the volume of water displaced by the craft when in submerged position is greater than that of this craft and its passengers.

The buoyancy thus being larger than the weight in service of the craft, the latter floats on the surface of the water on which it moves. Thanks to the siphons 25 the floats 2 and the chimneys 17 cannot fill with water and the craft is automatically maintained in surface position.

To accomplish the submersion of the passenger cabin, the passenger(s) starts the motor M which drives the blower 20 and places the valve 23 in its position as illustrated at FIGURE 5, in which the chimneys 17 are connected to the suction side of the blower 20. This blower thus causes a depression in the chimneys 17 and in the floats 2 and, as a result, they start filling with water. As a matter of fact, the water is sucked in through the siphons 25 and it fills the floats and then the chimneys 17 progressively.

A certain quantity of water is therefore sucked in and raised in the inside of the chimneys 17 above the water level in such a manner that the craft undergoes not only a reduction of its buoyancy by the filling up of the floats but also a downward thrust due to the weight of the water above the water level.

The chimneys 17 are dimensioned in such a way that their volume is sufficient in order to raise above the water level a mass of water sufficient to overcome the reduced buoyancy of the craft (buoyancy when the floats are full of water). As of this moment, the craft sinks progressively as a new quantity of water is sucked into the chimneys.

The maximum depth of immersion is limited by the force of the blower 20. As a matter of fact, the blower is dimensioned in such a way that the mass of water raised above the water level inside the chimneys 17 is never equal to nor greater than the buoyancy of the craft when entirely submerged. In this manner, it is not possible to obtain this total submersion and the maximum depth of submersion shall always be inferior to the height of the chamber 17.

On the other hand, the dimensions of the chimneys must be such that the volume of water raised above the water level reprents a weight superior to the instantaneous buoyancy of the craft reduced by the weight of its submerged part.

Thus it can be seen that, constructively, by the volume of the chimneys 17, it is impossible to obtain in their inside a mass of water, the weight of which would be superior or equal to the maximum buoyancy of the craft (buoyancy when the craft is completely submerged) so that the depth of submersion is limited, which ensures the complete safety of the craft.

Figure 6:
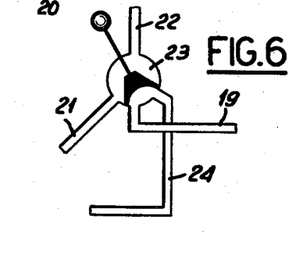
FIGURE 6 is a detail view of the immersion device.

When the passenger wants to ascend again to the surface he actuates the valve 23 and places it in the position illustrated at FIGURE 6, which brings about the connection with the free air of the suction side 21 of the blower 20 and the connection of the feeding duct 19 onto the discharge side 24 of this blower. This causes the water to be expelled from the chimneys 17 and then from the floats 2 through the siphons 25. The craft then progressively ascends to reach its surface position as illustrated at FIG. 2.

It can be noted that in case the motor M or the blower 20 should fail, the craft returns by itself to the surface position. As a matter of fact, the feeding duct 19 is put into connection with the free air through the blower 20 which stands still on account of the breakdown and thus does not provide any difference of pressure, and the depression disappears from the chimneys 17 so that the water which had been sucked in therein goes down again until reaching the same level as the water level on which the craft moves. This then causes the emersion of the craft. However, this emersion is not accomplished all the way to surface position. In fact, the blower having failed, the water contained in the floats, located underneath the upper elbow of the siphons 25, cannot be drained through these siphons. This however is not important since in this position already the opening of the cabin 1 is above the water level and the cover 3 can be opened to let the passengers out.

It is therefore evident that the craft thus provided is absolutely safe since, on the one hand, the depth of immersion is limited by the construction of the craft and, on the other hand, in the case of a failure of the engine this craft returns by itself into upward position that allows the passengers to come out.

In a variant, the chimneys 17 could be provided in several sections displaceable in respect to one another, either in a telescopic way or by means of hinges, so as to reduce the height of these chimneys 17 when the craft is in surface position.

In the case of telescopic hinges it is possible to house the volume that will be filled with water by suction in the upper part of the hinge, this upper portion encircling the lower portion and sliding over the latter. Moreover, in whatever the position of the craft, the lower edge of the upper part of this chimney must be submerged. Then, by sucking in a volume of water into the inside of the space provided in the upper part of this chimney, a ballast is provided for the craft, and then by directing pressurized air—for example air expelled from the cabin—into the upper part of the chimney, a relative displacement is caused between the two parts of the chimney, resulting in the submersion of the craft, since the volume of the water sucked in serves as a counter-weight to the buoyancy due to the submersion of the cabin.

In such a variant, the part of the chimney that contains the space to be filled with water is no longer fastened to the cabin, however, the force due to this space filled with water and directed in the opposite direction of the buoyancy of the craft is transferred to this cabin.

In the embodiment shown, the immersion device also comprises compensation floats 26 provided inside each chimney 17. These compensation floats 26 are meant to automatically compensate the modifications of the balance of the craft, caused either by the irregular filling of the floats and chimneys or by the rough movement of the water level on which the craft is sitting. These compensation floats extend approximately parallel to the longitudinal axis of the chimneys 17 and each forms a watertight space determining some buoyancy, varying according to the water level inside the concerned chimney.

If the craft should tend to heel over the front for example, the submerged part of the compensation floats 26 in the front chimneys 17 shall be larger than the submerged part of the compensation floats 26 in the rear chimneys. Consequently, the front compensation floats give a greater lift than the rear compensation floats, which tends to return the craft to a perfectly horizontal position. These compensation floats or auxiliary floats are attached to the craft and are approximately perpendicular to the water level and they occupy such a height above this water level that, when the craft is completely submerged, their upper part is approximately at the water level.

As variants, it is evident that these compensation floats could be located elsewhere than in the chimneys. On the other hand, since the balancing of the craft in a particularly important and delicate problem at the beginning of the immersion these compensation floats could be provided with cross-sections tapering upwards. This way, a greater compensation lift is obtained at the beginning of immersion rather than at the end.

It is evident that, in practice, as already mentioned, the ducts 17, 18, 19, as well as the siphons 25 could be arranged completely or partially inside the chimneys 17 and the floats 2 of the craft so as to make its appearance more pleasing and also to efficiently protect the above elements from possible impacts and damages.

It is also evident that the controls, first of the motor M and, secondly, of the valve 23, are in practice easy to reach from the inside of the passenger cabin so that the passengers may operate their craft without difficulty. This is however no problem since all these controls can be introduced into the cabin through the free annular space existing between the upper part of the cabin 1 and the lower part of the covers 3.

In a general manner, the immersion device therefore comprises a duct (chimneys and floats) rendered fast at least temporarily with the passenger cabin, and an extremity of which is connected to the water level underneath the water line $b$ of the craft when the craft happens to be in surface position (FIG. 1) and the other extremity of the duct emerges above that water line and is connected to an air sucking device to create a depression inside this duct.

Moreover, this duct is of a volume, located above the water line $b$ of the craft in surface position, whose dimensions are such that the weight of a corresponding volume of water is at least equal to the buoyancy of the craft in surface position but at most equal to its buoyancy when in complete submersion position.

It is to be noted that the buoyancy of the craft varies according to its immersion. As a matter of fact, this buoyancy has a minimum value when the craft is in surface position, then this buoyancy increases progressively with the immersion of the craft. Finally, this buoyancy reaches a maximum value, practically constant when the cabin is completely submerged.

The volume of water raised by suction therefore will reach a first minimum value owing to which the craft begins to immerge and will then increase to cause the total immersion of the cabin. Thereafter, this volume of water raised above the water level remains approximately constant but tends to increase in view of the immersion of some full parts of the craft, which diminishes the weight thereof and thus tends to increase its buoyancy. But to more deeply immerge the craft, one must, by evacuating the chimneys, lower these in respect to this raised volume of water.

One must also note that the immersion device duct may be in several sections independent one from another. As a matter of fact, it suffices, when the craft is partly immerged by means of a first duct into which a volume of water is sucked in, that a second duct, or second section of duct, have its lower aperture submerged to make it possible to continue the immersion by sucking in another quantity of water into this second section. The duct of the immersion device could thus be comprised of several sections in series.

In particular, the embodiment shown could be modified in that the chimneys would not be connected to the floats and that in surface position their lower extremities would be out of the water. Thereafter, in a position partly submerged, when the floats are full of water, the progressive submersion of the craft would be sufficient to introduce the bottom part of the chimneys into the water and the immersion would continue in the manner described by creating a depression in the chimneys.

Furthermore, the air sucking device is dimensioned in such a way that the weight of the total volume of water sucked in above the level of the water is less than the maximum buoyancy of the craft, that is to say to the buoyancy of the craft when in service (with passengers in), when completely submerged. This restriction can also be achieved by the volume of the duct and not by the sucking force of the air sucking device.

In some variants, the compensation floats 26 could be of an expanded synthetic material so as to be safe. These compensation floats could also be dimensioned so as to ensure the buoyancy of the craft even when the cabin is filled with water on account of an accident, for example. It is therefore evident that the craft is completely safe.

Figure 7:
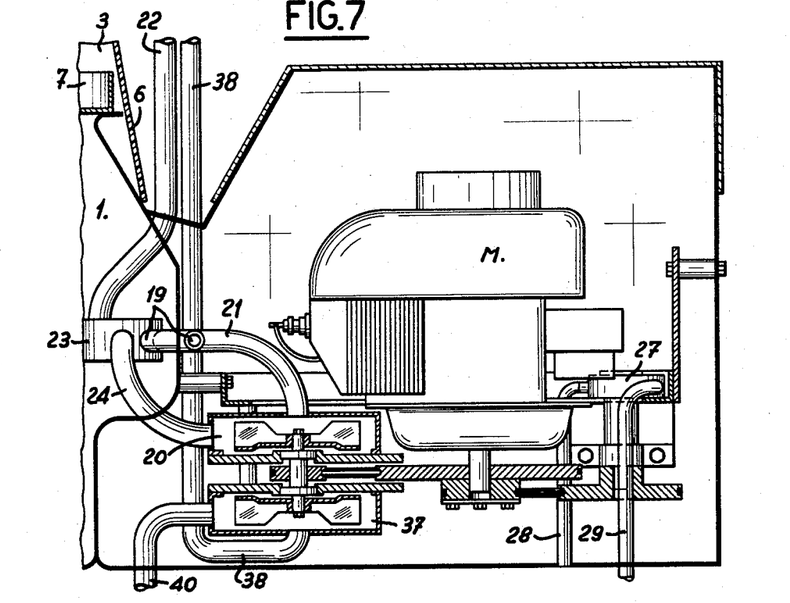
FIGURE 7 is a partial elevation, partly in cross-section, of the rear part of the craft illustrating the propulsion motor and a part of the immersion, propulsion and ventilation devices.
Figure 8:
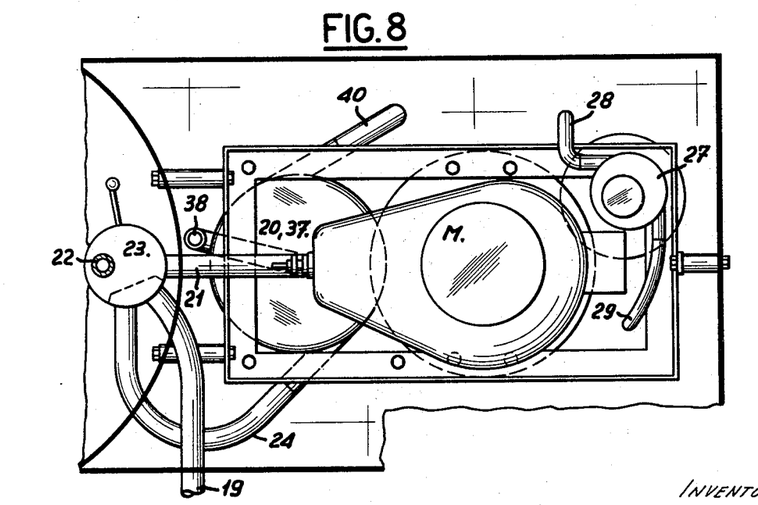
FIGURE 8 is a vew from underneath of the components as illustrated in FIG. 7.

In the embodiment shown in FIGURES 7 and 8, the motor M drives the blower 20 of the immersion device by means of a trapezoidal belt.

Figure 9:
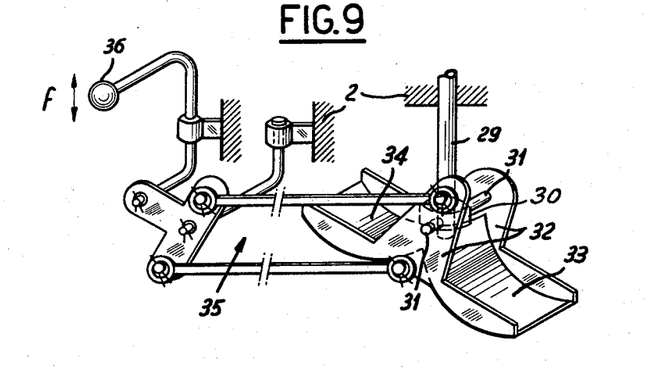
FIGURE 9 is a schematic view of the propulsion device.

(D) The propulsion device comprises a water pump 27 driven and rotated by the motor M by means of a trapezoidal belt, for example. This water pump 27 comprises an inlet manifold 28 whose aperture, which could be provided with a filter, opens under the level of the water on which the craft floats. The suction manifold 29 of this water pump 27 is directed upwards and near its lower extremity comprises a ring 30 pivoting around this manifold (FIG. 9). This ring 30 is provided with two trunnions 31 dimetrally opposed extending out of the external surface of this ring 30. A double scoop 32 constituting a deflector is mounted and pivots on the trunnions 31 in such a way that the edge dividing the scoops 33, 34 are located axially to the manifold 29, when in the rest position these scoops are disposed symetrically in respect to a horizontal plane.

The position of this double scoop 32 in respect to the manifold 29 is fixed by a system of rods comprising a parallelogram 35 that can be distorted, which allows oscillation around a horizontal axis, defined by the trunnions 31 of the double scoop 32, of the double scoop 32 upon a vertical displacement of a manipulation component 36 (according to arrow $f$). This system of rods, moreover, is such that upon a horizontal angular displacement of the manipulation component 36 an angular displacement can be obtained, around the longitudinal axis of the manifold 29, of the double scoop 32.

This control system of rods thus allows to direct the double scoop 32 angularly in respect to the manifold 29 and thus to divert the water jet coming out of this manifold in a manner to cause the craft to turn. Further, this system of rods also allows, through the pivoting outside the horizontal plane of the double scoop 32, to choose which scoop 33 or 34 the water jet from the manifold 29 is projected into. In this manner the craft can be made go forward or backward.

It is also evident that the manipulation component 36 is easy to reach from the inside of the cabin. Here also the mechanical liaison between this manipulation component 36 and the parallelogram 35 is made by passing through the inside of the free space located between the cabin 1 and the cover 3.

E. The ventilation device of the cabin comprises a fan 37 also driven by the motor M. In the example shown, this fan 37 is co-axial with the blower 20 and is driven by the same trapezoidal belt as the latter. The suction side of this fan 37 is connected to the free air by means of a suction tube 38. The length of this tube is sufficient, in fact just like that of the tube 22, to allow its aperture to be out of the water in position of the craft. These two tubes are also provided with anti-wave valves 39 preventing any inopportune introduction of water into them.

The discharge pipe 40 of the fan 37 opens inside a bell 41 fastened to a float 2, for example, or to the cabin 1. The extremity of this pipe 40 is bent downward to prevent the water from coming into the fan, should this fan 37 fail.

The lower edge 42 of this bell 41 is located in the same plane as the lower edge of the cover 3 when the latter is in closed position on the cabin 1.

This bell 41 is also connected inside the cabin 1, therefore inside of the passenger cabin, by means of a tube 43 whose extremity located inside the bell 41 constitutes a siphon. The free open extremity 44 of this siphon is located in a plane between the plane of the lower edge of the cover 3 and the plane of the upper edge of the cabin 1.

Upon submersion of the passenger cabin, the cabin and the bell 41 being filled with air, there occurs a water level in the space comprised between the cover 3 and the cabin 1, depending on the outside pressure and, therefore, on the immersion depth. The maximum submersion depth being restricted it is then easy to constructively provide for the distance separating the lower edge of the cover 3 and the upper edge of the cabin 1, in any position of the passenger cabin, to be sufficient so that the water never gets into the inside of the cabin. A margin for safety must also be provided in consideration of the movement of the water and the possible heel of the craft.

Since the siphon of the tube 43 opens at 44 inside the bell 41 and it is obturated by the water level, the air occluded inside the passenger cabin cannot get out.

When the motor M is started the fan 37 sends pressurized air into the bell 41, which causes a fall in the water level inside that bell until the moment when the aperture 44 of the tube 43 emerges from the water and the air sent by the fan reaches the inside of the passenger cabin. The pressure of this fan then causes a fall in the water level in the space between the cover 3 and the cabin 1 and the air can escape through this space. In this manner a continuous ventilation is obtained in the passenger cabin.

It is evident that the pressure delivered by the fan 37 must be sufficient to ensure this ventilation even when the cabin is in the maximum submersion position.

This device has the great advantage of requiring no joint, not even between the cockpit and the cabin, which is appreciable because joints are elements that need to be maintained, frequently checked and often replaced.

Thereby the craft described proves to be absolutely safe and it is strongly-built and requires hardly any maintenance.

Figure 10:
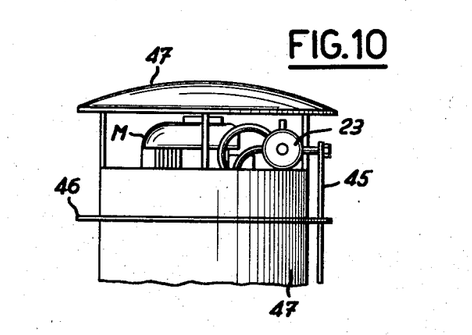
FIGURE 10 is a view illustrating another possible position for the propulsion motor.

In the embodiment described, the motor M (FIGS. 7 and 8) is provided inside a seal-tight compartment connected to free air by means of an air supply tube; however, a simpler solution would consist in placing the motor M in a housing provided in the upper extremity of one of the chimneys 17 (FIG. 10). In this manner, the motor is always out of the water whatever the position of the craft. The control of the valve 23 is by means of a rod 45 whose lower extremity is inside the passenger cabin. A break water 46 and a cap 47 may be provided to protect the motor M from splash.

In a variant schematically illustrated in FIGURE 5, the upper part of the chimneys presents a reduced section, the dimensions of which are such that when the water rising in these chimneys reaches this part of reduced section, the weight of the quantity of water above the water level inside these chimneys becomes less than the buoyancy of the craft diminished by the weight of its emerged part. In this manner, the depth may be limited accurately.

It is to be noted that the passenger cabin does not necessarily have to contain all of the passenger. As a matter of fact, this passenger cabin operating on the principle of a diving bell, it is evident that it suffices that it shelters the head of the passenger to allow him to breathe. The rest of the body of the passenger could be in the water.

In such a variant, the cabin would be replaced by a plain seat over which would be fastened the cover, which would contain the air necessary for the passenger to breathe. This cover could be provided with a ventilation device allowing renewal of the air contained in it.

Figure 11:
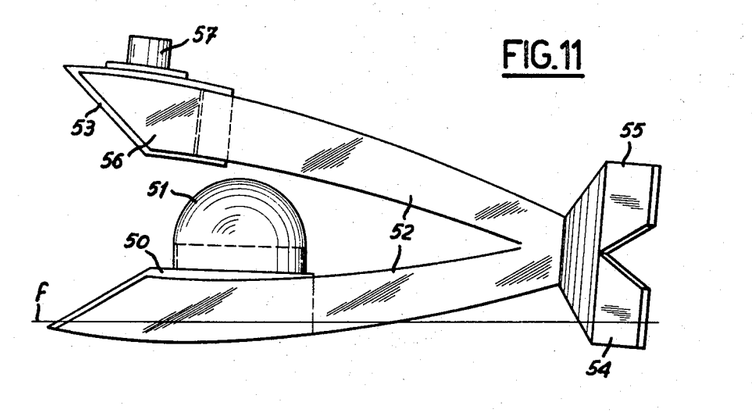
FIGURES 11 and 12 respectively are a side view and a view from above of the craft.
Figure 12:
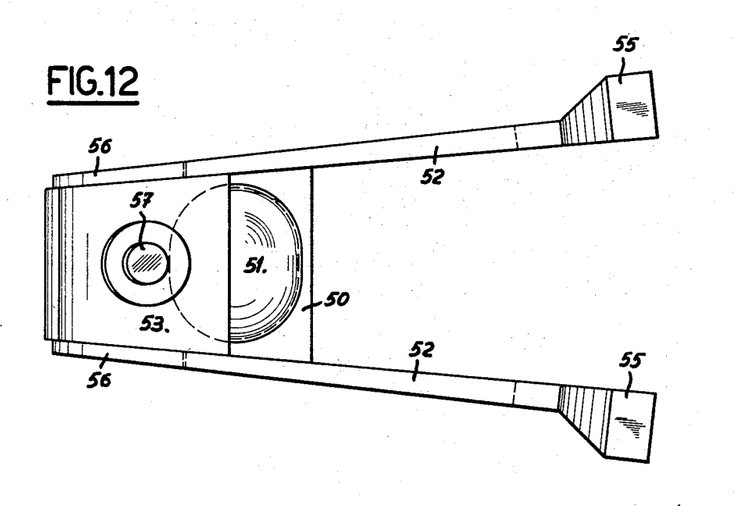

The variant of the submarine craft illustrated in FIG-

URES 11 and 12 also essentially comprises the four following components:

(1) a passenger cabin;
(2) an immersion device;
(3) a propulsion device;
(4) a ventilation device for the passenger cabin.

The passenger cabin comprises a cabin 50 that can accommodate one or several pasengers abreast facing the front of the craft, for example. The shape of this cabin 50 is thus somewhat different from that of the cabin 1 previously described. On the other hand, the cover 51 may be identical to the cover 3.

Regarding the propulsion and ventilation devices of the passenger cabin, these can be identical or similar to those already described in reference to FIGURES 1 thru 10. However, these two devices are subject to modifications without modifying the principle of functioning of the craft, whose basic principle is also found in this variant.

The immersion device of this variant of the craft comprises two hollow bodies 52, fastened to the cabin 50 by means of their front lower extremities, each presenting the general shape of a C, seen sideways. Seen from above, these hollow bodies 52 form a V, the cabin 50 being located at the base of this V.

Each of these hollow bodies 52 communicates with the water below the water line f of the craft by means of openings preferably located in the immediate proximity of the cabin 50. The upper extremities of the hollow bodies 52 are fastened to a tank 53 located approximately vertically above the cabin. Moreover, these hollow bodies 52 communicate with this tank 53.

This immersion device also comprises two pairs of rear floats 54, 55, one normally located partly or wholly above the water line, and the other located, even when the craft is in submerged position, at least partly above this water line f. A safety float 56 is placed near the upper extremity of the immersion device.

Finally, this immersion device also comprises an air sucking device 57 allowing to create a depression in the duct formed by the tank 53 and the two hollow bodies 52. This sucking device, as well as the propulsion device, may be actuated or controlled from inside the passenger cabin.

The functioning of this variant of the craft, which proceeds from hte same principle as that of the embodiment described with reference to FIGURES 1 through 10, is as follows:

When the passenger starts the air sucking device, the depression caused in the hollow bodies 52 sucks in water inside of them above the water level. These hollow bodies progressively fill with water and in one phase the cabin sinks by rotating around the floats 54. Then, when the lower arms of the hollow bodies 52 are filled with water and their upper arms progressively fill, the cabin continues to immerse. However, the craft makes a slight rotation around the cabin this time, which repositions the cabin, in relation to a horizontal plane, in a position about equal to its starting position. These successive heels of the cabin being of small amplitude, they do not disturb the passengers. Finally, the tank 53 is filled with water and the craft continues to immerse, this time with a rotative movement approximately around the rear floats 55.

In the submerged position, the cabin and the lower arms of the hollow bodies are under water but the craft is kept on the surface by the floats 55 and 56 which render the craft completely safe, even if the cabin happened to fill with water by accident.

To return to surface position it suffices to stop the air sucking device 57 and the water contained in the tank 53 and the hollow bodies 52 is discharged by gravity, thus causing the emersion of the craft up to its surface position, with the series of movements as previously described for the immersion, but in the reverse order.

In a variant, one hollow body 52 alone could be provided. In this case, the rear floats 54, 55 should be fastened to the extremities of a cross-piece fastened to the rear of this hollow body by its median part in order to render the craft stable.

In another variant, the air sucking device, or air pump, 57 could be replaced by a water pump adapted to force water into the hollow body or bodies 52.

What I claim is:

1. A submersible craft comprising in unitary assembly a passenger cabin, at least one reservoir having a cross-sectional area that increases upwardly, and pump means for causing the flow of water into and out of the reservoir to cause the craft to sink and rise between a submerged position when the reservoir is full and a surface position when the reservoir is at least partly empty, said reservoir communicating with the water below the water line of the craft in said surface position and extending out of the water in said submerged position.

2. A submersible craft comprising in unitary assembly a passenger cabin, at least one reservoir, pump means for causing the flow of water into and out of the reservoir to cause the craft to sink and rise between a submerged position when the reservoir is full and a surface position when the reservoir is at least partly empty, said reservoir communicating with the water below the water line of the craft in said surface position and extending out of the water in said submerged position, and siphon means by which said reservoir is continuously in communication with the subjacent water, whereby the craft tends to seek a surface position when the pump means is inoperative.

3. A craft as claimed in claim 2, said passenger cabin comprising a body and a removable cover which closes said body from above, said cover having a lower edge that is laterally spaced from said body thereby to define a space between said body and said cover, said space encompassing the passenger cabin.

4. A craft as claimed in claim 3, and means mounting said cover for vertical swinging movement on and relative to said body.

5. A submersible craft comprising in unitary assembly a passenger cabin, at least one reservoir, pump means for causing the flow of water into and out of the reservoir to cause the craft to sink and rise between a submerged position when the reservoir is full and a surface position when the reservoir is at least partly empty, said reservoir communicating with the water below the water line of the craft in said surface position and extending out of the water in said submerged position, means for propelling the craft through the water, said propelling means comprising means for directing a jet of water downwardly, and a deflector for deflecting the jet of water so that the deflected jet exerts a substantial horizontal component of force on said deflector.

6. A submersible craft comprising in unitary assembly a passenger cabin, at least one reservoir, pump means for causing the flow of water into and out of the reservoir to cause the craft to sink and rise between a submerged position when the reservoir is full and a surface position when the reservoir is at least partly empty, said reservoir communicating with the water below the water line of the craft in said surface position and extending out of the water in said submerged position, means for feeding air under pressure to the interior of the passenger cabin, means for propelling the craft through the water, and a drive motor which is common to and operates all of said air-feed means and said propelling means and said pump means.

7. A craft as claimed in claim 2, said reservoir having a cross-sectional area that increases upwardly, means defining at least one stabilization chamber in communication with and disposed between said siphon means and said reservoir, there being several said reservoirs communicating with said stabilization chamber, said passenger cabin comprising a body and a removable cover which closes said body from above, said cover having a lower edge that is laterally spaced from said body thereby to define a space between said body and said cover, said space encompassing the passenger cabin, and means for propelling the craft through the water.

8. A craft as claimed in claim 2, and means defining at least one stabilization chamber in communication with and disposed between said siphon means and said reservoir.

9. A craft as claimed in claim 8, there being several said reservoirs communicating with said stabilization chamber.

10. A craft as claimed in claim 1, said passenger cabin comprising a body and a removable cover which closes said body from above, said cover having a lower edge that is laterally spaced from said body thereby to define a space between said body and said cover, said space encompassing the passenger cabin.

11. A craft as claimed in claim 10, and means mounting said cover for vertical swinging movement on and relative to said body.

12. A craft as claimed in claim 5, and means mounting said deflector for horizontal swinging movement about an upright axis.

13. A craft as claimed in claim 5, said deflector comprising a double shovel, and means mounting said deflector for vertical swinging movement about a horizontal axis intermediate the length of the deflector.

14. A craft as claimed in claim 6, and a sealed compartment in which said motor is disposed.

15. A craft as claimed in claim 6, said motor being above the water level in said submerged position of the craft.

References Cited

UNITED STATES PATENTS

| | | | |
|---|---|---|---|
| 3,051,114 | 8/1962 | Bajulaz | 114—16 |
| 3,301,209 | 1/1967 | Caldwell | 114—16 |
| 3,351,035 | 11/1967 | McLean | 114—16 |

TRYGVE M. BLIX, *Primary Examiner.*